United States Patent [19]

Bech et al.

[11] Patent Number: 4,694,637
[45] Date of Patent: Sep. 22, 1987

[54] METHOD AND APPARATUS FOR GROUPING, ORIENTING, AND PACKING ARTICLES

[75] Inventors: Marcus C. Bech, Hillerod; Ole Koster, Roskilde, both of Denmark

[73] Assignee: Stormax International A/S, Herley, Denmark

[21] Appl. No.: 788,311

[22] Filed: Oct. 17, 1985

[30] Foreign Application Priority Data

Oct. 17, 1984 [DK] Denmark ............... 4965/84

[51] Int. Cl.⁴ .......... B65B 5/08; B65B 35/38; B65B 35/56
[52] U.S. Cl. ...................... 53/448; 53/142; 53/152; 53/247; 53/251; 53/443; 53/537; 198/458; 198/604; 414/30
[58] Field of Search .......... 53/142, 148, 152, 244, 53/247, 251, 236, 443, 448, 537; 198/458, 604; 414/30 X, 31, 71

[56] References Cited

U.S. PATENT DOCUMENTS

| | | | |
|---|---|---|---|
| 3,124,231 | 3/1964 | Ott ................. | 198/604 |
| 3,767,027 | 10/1973 | Pund et al. ........ | 198/458 |
| 3,860,232 | 1/1975 | Martin .............. | 198/458 |
| 4,042,124 | 8/1977 | Bowdy et al. ...... | 414/30 |
| 4,555,892 | 12/1985 | Dijkman ............ | 53/247 |

Primary Examiner—John Sipos
Assistant Examiner—Donald R. Studebaker
Attorney, Agent, or Firm—Pollock, Vande Sande & Priddy

[57] ABSTRACT

In a method of grouping, orienting, and packing articles such as ice-cream cones, the cones are advanced in rows on conveyors while being grouped and oriented, and are subsequently gripped in groups by a gripping device. Through suction heads gripping their respective groups, the gripping device is adapted to situate the groups in an open packing box. To permit the process to be carried out at a relatively high speed and low noise level, the articles are initially advanced in a first advancing direction while lying directly on a first endless and continuously running conveyor. They are then received in groups by a second endless and continuously running conveyor, which lifts the cones into contact with the suction heads of the gripping device while the mutual distance of the cones is being adjusted. The transfer of the cones from the first conveyor and through the second conveyor to the gripping device is carried out without stopping the advancing movement of the cones.

11 Claims, 9 Drawing Figures

METHOD AND APPARATUS FOR GROUPING, ORIENTING, AND PACKING ARTICLES

FIELD OF THE INVENTION

The invention relates to a method of grouping, orienting, and packing articles such as ice-cream cones having a cross section perpendicular to a longitudinal direction, the area of said cross section substantially decreasing towards one end of the article, seen in the longitudinal direction, and whereby the articles are first advanced in rows on conveyor means, and then grouped and oriented so as finally to be gripped in groups by a gripping device positioning the articles in an open packing box by means of gripping means such as suction heads gripping their respective articles.

DESCRIPTION OF THE PRIOR ART

Danish Patent Application No. 1173/81 discloses a method of grouping, orienting, and packing ice-cream cones, whereby the articles are advanced on conveyor means, grouped and gripped by means of a gripping device collecting the articles and transferring said articles into a packing box advanced on a conveyor. The ice-cream cones are advanced on the conveyor means while situated in loose, sleeve-shaped holders. The conveyor means comprise a first conveyor advancing the ice-cream cones to an abutment, from which the ice-cream cones and the associated sleeve-shaped holders are transferred in groups to a second conveyor adjusting the holders in a horizontal position. In the horizontal position the holders are stopped and the ice-cream cones are pushed in groups onto a supporting device from which they are gripped by the gripping device. This method requires the use of hard, handy and relatively heavy holders, and for at least the second conveyor to be stopped every time another group of ice-cream cones is to be transferred to the supporting device. The latter causes a relatively high consumption of energy and a relatively low capacity. In addition the use of the relatively heavy sleeve-shaped holders and the frequent stops thereof imply that the system in question presents a relatively high noise level.

SUMMARY OF THE INVENTION

The method according to the invention is characterized in that the articles are advanced in a first advancing direction while lying down on a first endless and continously running conveyor, from which the articles are received in groups by a second endless and continuously running conveyor and moved in a second advancing direction extending substantially parallel to the moving direction of the gripping means of the gripping device during the gripping phase of their working cycle, the second conveyor being capable of adjusting the mutual distance of the articles to the mutual distance of the gripping means before the latter grip the articles from the second conveyor.

As a result a method is provided which allows rapid and relatively noiseless handling of articles such as ice-cream cones without involving loose, heavy holders. The latter is especially due to the fact that the conveyor means used operate continuously without stops and handle the ice-cream cones directly so that they are moved in groups without stops towards the gripping means of the gripping device.

According to the invention, the articles may be advanced on the first conveyor with opposite ends projecting to their respective sides of the conveyor in the transverse direction of said conveyor, while the second conveyor receives the articles from the first conveyor by gripping the free projecting ends of each article, whereby the transfer from the first conveyor to the second conveyor can be carried out in a relatively simple manner.

The invention also relates to a system for carrying out the invention, said system comprising conveyor means advancing the articles to a gripping device gripping the articles in groups by means of gripping means such as suction heads and transferring said articles to an open packing. The system according to the invention is characterized in that the conveyor means comprise a first endless and continuously running conveyor with fixedly mounted holders supporting their respecting articles in a substantially mutually fixed position, and a second continuously running conveyor with receiving means both receiving the articles in groups from the first conveyor without stopping the advancing movement thereof and moving the articles to a level where they are simultaneously gripped by the gripping means of the gripping device, the mutual distance of the articles being adjusted to the mutual distance of the gripping means by means of the second conveyor. As a result, a simple and efficient system is obtained which allows the handling of ice-cream cones in a continuously running manner at a speed determined by the speed at which the gripping device is capable of gripping the groups of articles from the second conveyor.

Furthermore, according to the invention the second conveyor may comprise two mutually separated conveyor members situated on their respective sides of the advancing path of the first conveyor, each conveyor member comprising endless conveyor paths extending vertically from a lower article-receiving level to a higher article-delivering level during the phase when they are carrying the articles. In this manner the receiving by the second conveyor of the articles from the first conveyor can be carried out in a particularly simple manner, and the gripping device can reach the ice-cream cones easily when said cones reach the higher article-delivering level.

The system according to the invention is furthermore characterized in that the holders of the first conveyor are of such an extent in the transverse direction of the conveyor that the opposite ends of the articles, when seen in the longitudinal direction thereof, project outside the holders, and that the second conveyor comprises receiving means receiving the articles by gripping the free ends of said articles, the receiving means of each end of the articles being situated on their respective conveyor members of the second conveyor. As a result, a particularly advantageous embodiment of the invention is obtained.

Furthermore, according to the invention the individual conveyor members of the second conveyor may comprise two vertically situated, parallelly extending chain drives carrying their respective ends of a plurality of parallel, horizontally extending guide rails, on which sliders provided with receiving means are mounted, said sliders being freely displaceable on the rails and corresponding in number to the number of articles present in each group, one slider being provided for each article, and furthermore according to the invention guideways may be provided between the chain drives, said guideways co-operating with the sliders in such a manner that the mutual distance of said sliders at the lower article-receiving level corresponds to the mutual distance of the articles on the first conveyor, and at the higher article-delivering level corresponds to the mutual distance of the suction heads. In this manner, a particularly simply running conveyor is obtained.

Moreover, according to the invention the guideways may be mutually displaceable and each comprise fixed guideway members displaceably situated coaxially with the chain wheels of the chain drives and flexible guideway members situated therebetween, each fixed guideway member comprising a projecting tongue co-operating with a corresponding groove on the associated sliders, and the flexible guideway members may be endless round belts secured to the fixed guideway members in such a manner that they extend between the associated fixed guideway members in extension of the tongues thereof in order to engage the grooves of the sliders. As a result, the adjustment of the mutual distance of the articles during the handling on the second conveyor takes place by particularly simple means.

Furthermore, according to the invention the fixed guideways associated with at least the pair of chain wheels adjacent the article-delivering level may comprise coaxially situated, threaded openings co-operating with a common axially displaceable adjustment shaft also provided with threaded areas corresponding to each fixed guideway member, and the threads of each fixed guideway and the co-operating threaded areas on the adjustment shaft may be shaped in such a manner that a turning of the adjustment shaft causes an increase or reduction of the mutual distance of the fixed guideways in such a manner that the distance between said fixed guideways is always the same.

When used for the handling of ice-cream cones, each holder on the first conveyor may, according to the invention, comprise a center groove with a substantially conical surface, the axis of which extends transverse to the advancing direction of the conveyor with a slight inclination downwards to the side where the groove is broadest, and the first conveyor may comprise fixed guiding means against which the articles slide on the side adjacent the broadest end of the center groove of the holders, and each holder may comprise guide webs inclining upwards and to their respective side of the center groove and along the advancing direction of the first conveyor. In this manner particularly simple holders are obtained, which, with suitable dimensioning, comprise a relatively small contact surface to the articles in question, whereby a freezing to the holders is avoided. Simultaneously the guide webs allow easy, automatic positioning of the ice-cream cones in the holders whereby the articles are correctly situated for subsequent receipt by the receiving means of the second conveyor.

Finally, according to the invention guide lamellas may be provided between the guide rails of the second conveyor; these are also carried by the chain drives, and are capable of taking over the function of the first guide means during the passage of the articles between the conveyor members of the second conveyor at least at one side of the first conveyor. In this manner, the guiding of the article is carried out in a simple manner when they reach the second conveyor.

BRIEF DESCRIPTION OF THE DRAWING

The invention will be described below with reference to the accompanying drawing, in which.

DESCRIPTION OF THE PREFERRED EMBODIMENTS

Figure 1:
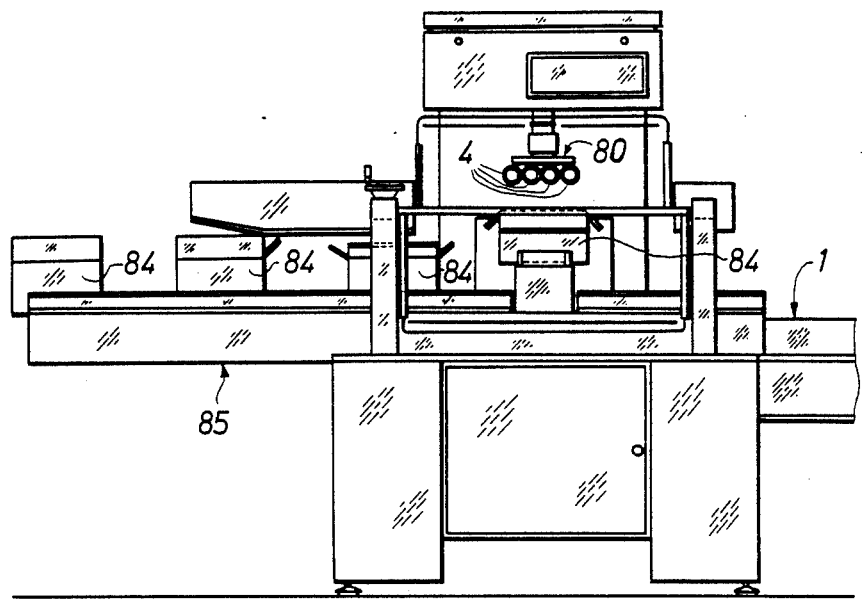
FIG. 1 is a diagrammatic side view of a system according to the invention.
Figure 2:
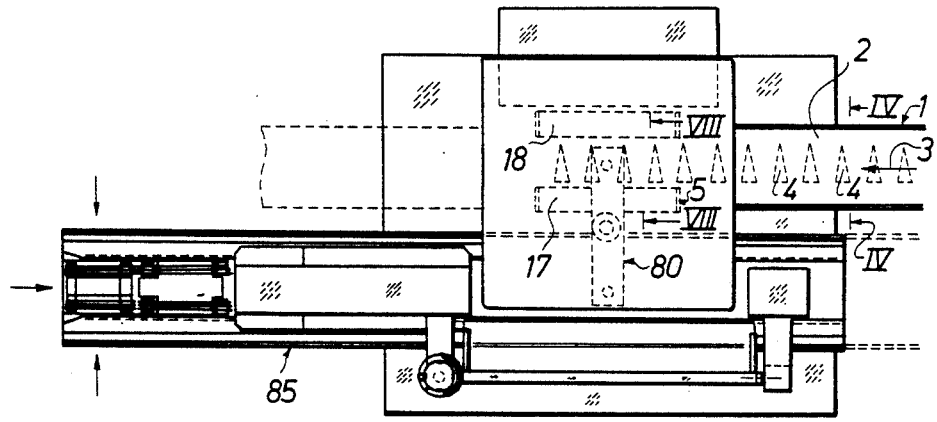
FIG. 2 is a top plan view of the system of FIG. 1.
Figure 3:
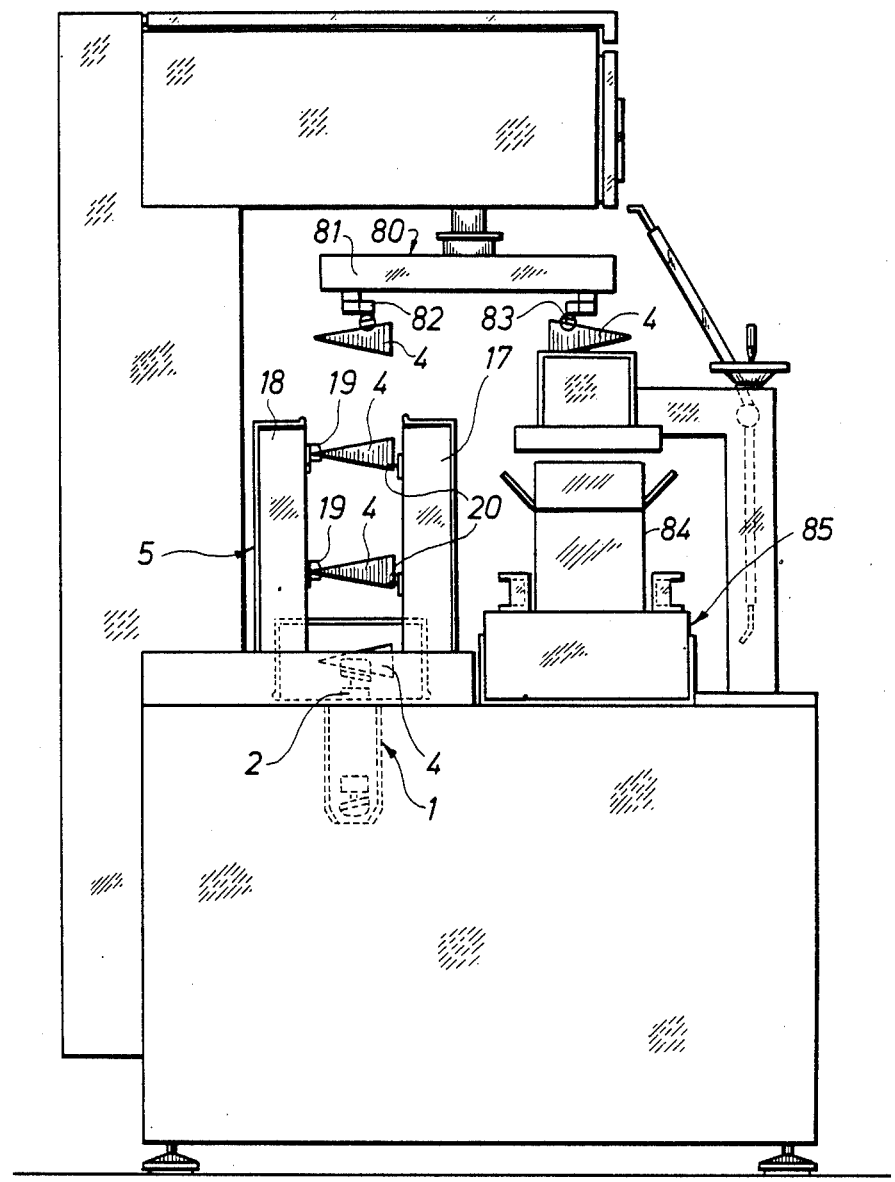
FIG. 3 is an end view of the system of FIG. 1.

The system illustrated in FIGS. 1 to 3 comprises a first conveyor 1 including an endless conveyor band 2 running about horizontal axes and adapted to advance ice-cream cones 4 in the direction indicated by the arrow 3 to a second conveyor 5.

Figure 4:
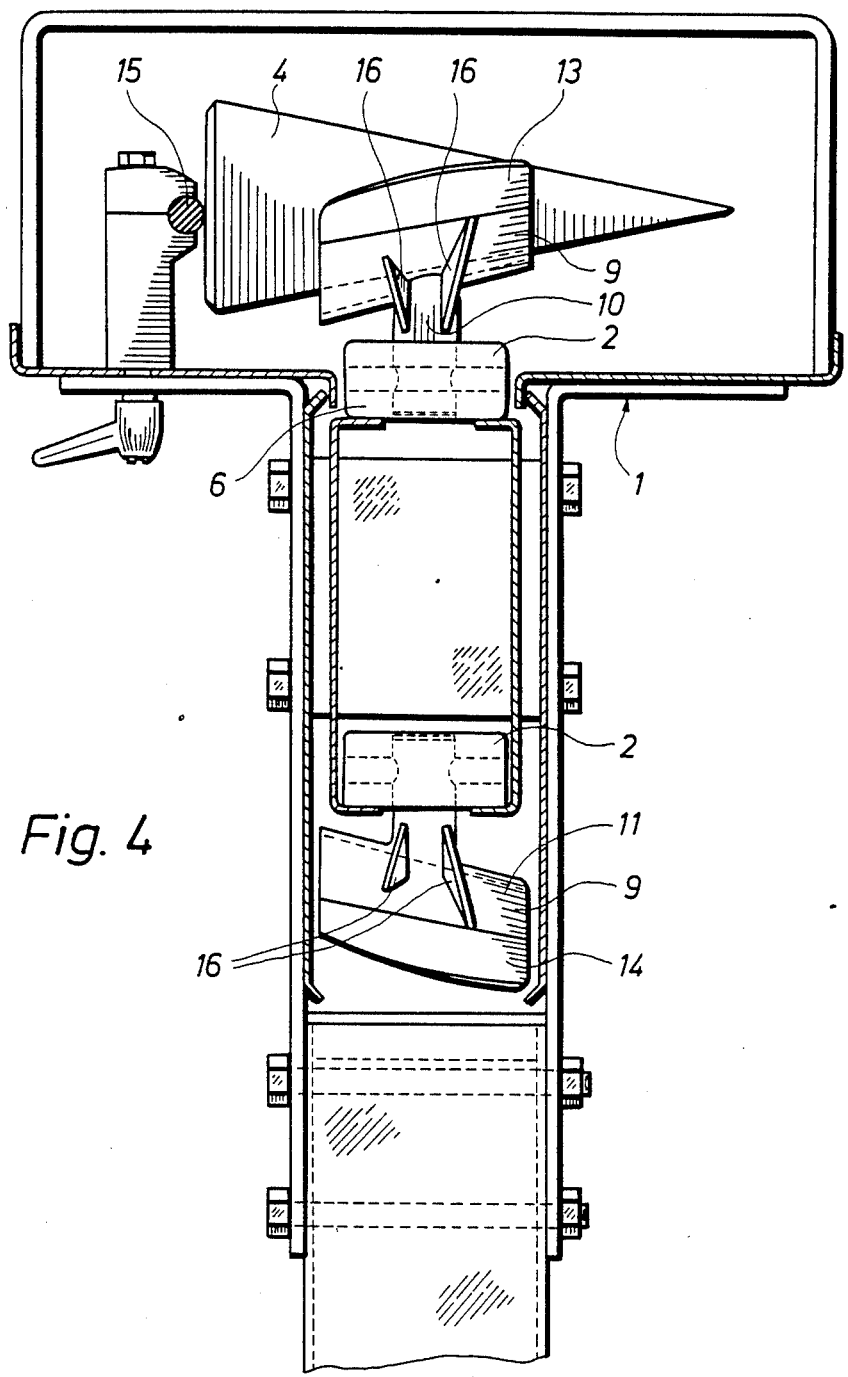
FIG. 4 is a vertical sectional view taken along the line IV—IV of FIG. 2.
Figure 5:
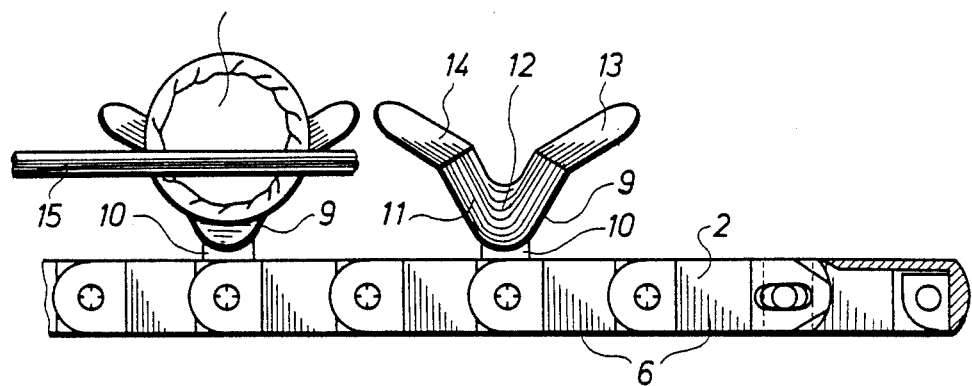
FIG. 5 is a side view of part of a first conveyor.
Figure 6:
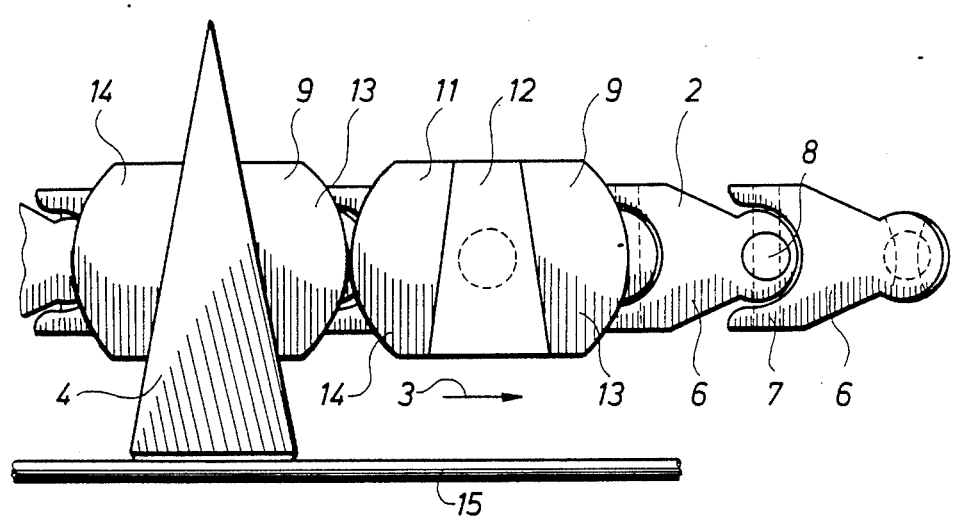
FIG. 6 is a plan view of the embodiment of FIG. 5.

As illustrated in FIGS. 4, 5 and 6, the conveyor band 2 of the first conveyor 1 comprises interhinged chain links 6 of a generally known type. These chain links 6 are mutually pivotably mounted about a horizontal shaft 7 and a shaft 8 extending perpendicular thereto (FIG. 6), in such a manner that the conveyor band can turn both about chain wheels (not shown) and change direction in the horizontal plane. Every other chain link 6 carries a fixed holder 9 receiving an ice-cream cone 4. This holder comprises a socket 10 fixedly connected to the chain link 6 and carrying a head 11 shaped of a plate-shaped body. This head forms a center groove 12 with a substantially conical surface, the axis of which extends transverse to the advancing direction 3 of the conveyor with a slight inclination downwards to the side where the groove is broadest. On both sides of the center groove 12, the head 11 of the holder 9 comprises projecting guide webs 13 and 14 extending obliquely upwards and to their respective sides relative to the centre groove.

As further illustrated in FIGS. 4 to 6, the first conveyor comprises a horizontally extending fixed guide rail 15 extending along one side of the advancing path of the conveyor band 2 at the side where the center groove 12 of the holder 9 is broadest. As already mentioned, the holder 9 is adapted to receive an ice-cream cone 4 which, because of the slight inclination of the holder head 11, has a tendency to slide forwards transverse to the advancing direction 3 of the conveyor band 2, and therefore the guide rail 15 serves to guide the front broadest end of the ice-cream cone 4 during its advance. All the ice-cream cones 4 present on the first conveyor 1 are thereby advanced in complete alignment.

As illustrated in FIG. 5 the centre groove 12 is of a conicity or shape differing slightly from the conicity of the ice-cream cone 4, such that the ice-cream cone 4 preferably abuts the head 11 of the holder 9 along only two lines. This assures that the ice-cream cone 4 cannot be frozen onto the holder 9. The purpose of the guide webs 13 and 14 is to correctly position ice-cream cones in their respective holders 9 when they are fed from an automatic ice-cream cone production plant (not shown) which may be of a generally known type.

As illustrated in FIG. 4, the head 11 of the holder 9 is supported by supporting webs 16.

The remaining members of the first conveyor may be shaped conventionally, and hence require no further explanation.

Figure 7:
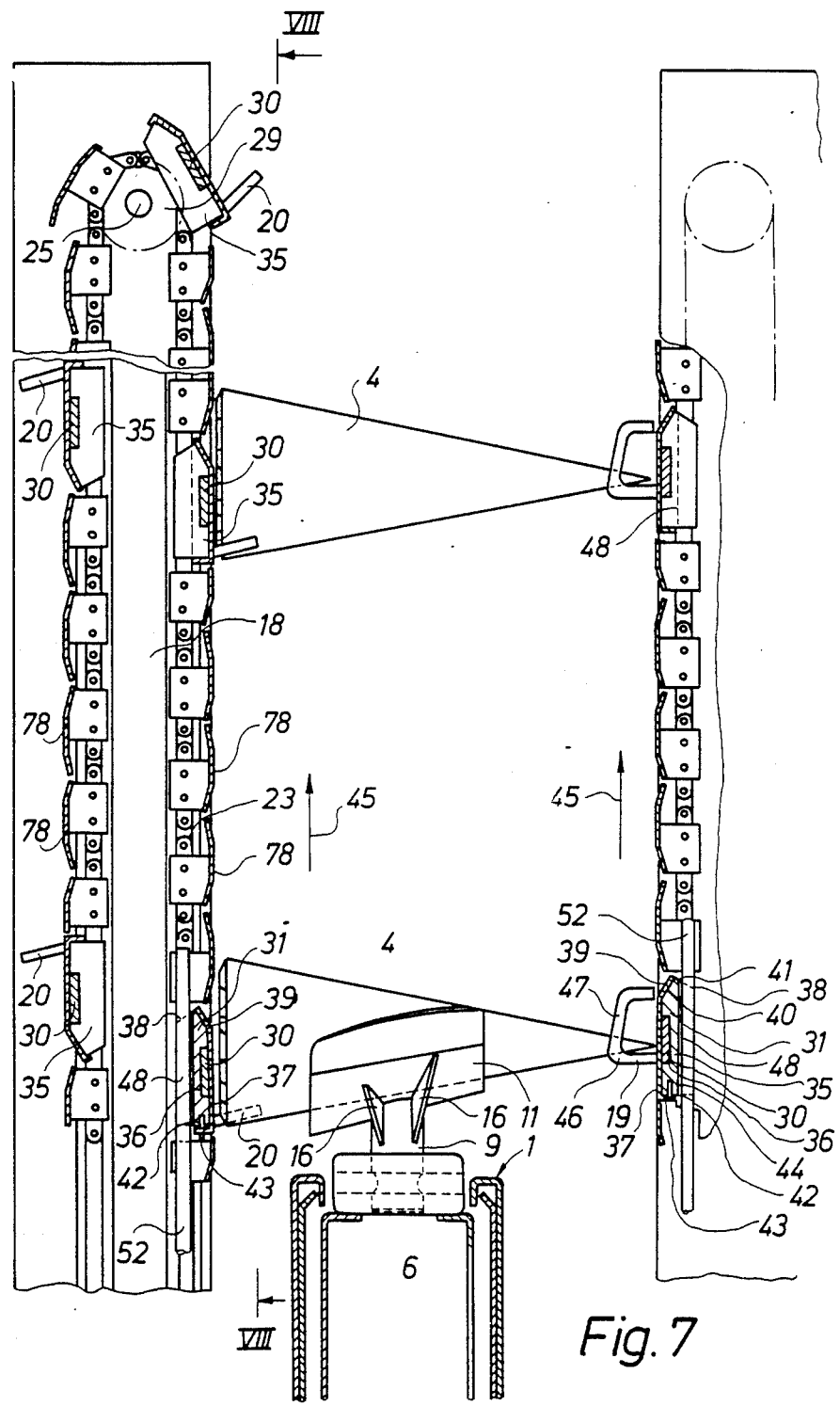
FIG. 7 is a vertical sectional view taken along the line VII—VII of FIG. 2.
Figure 8:
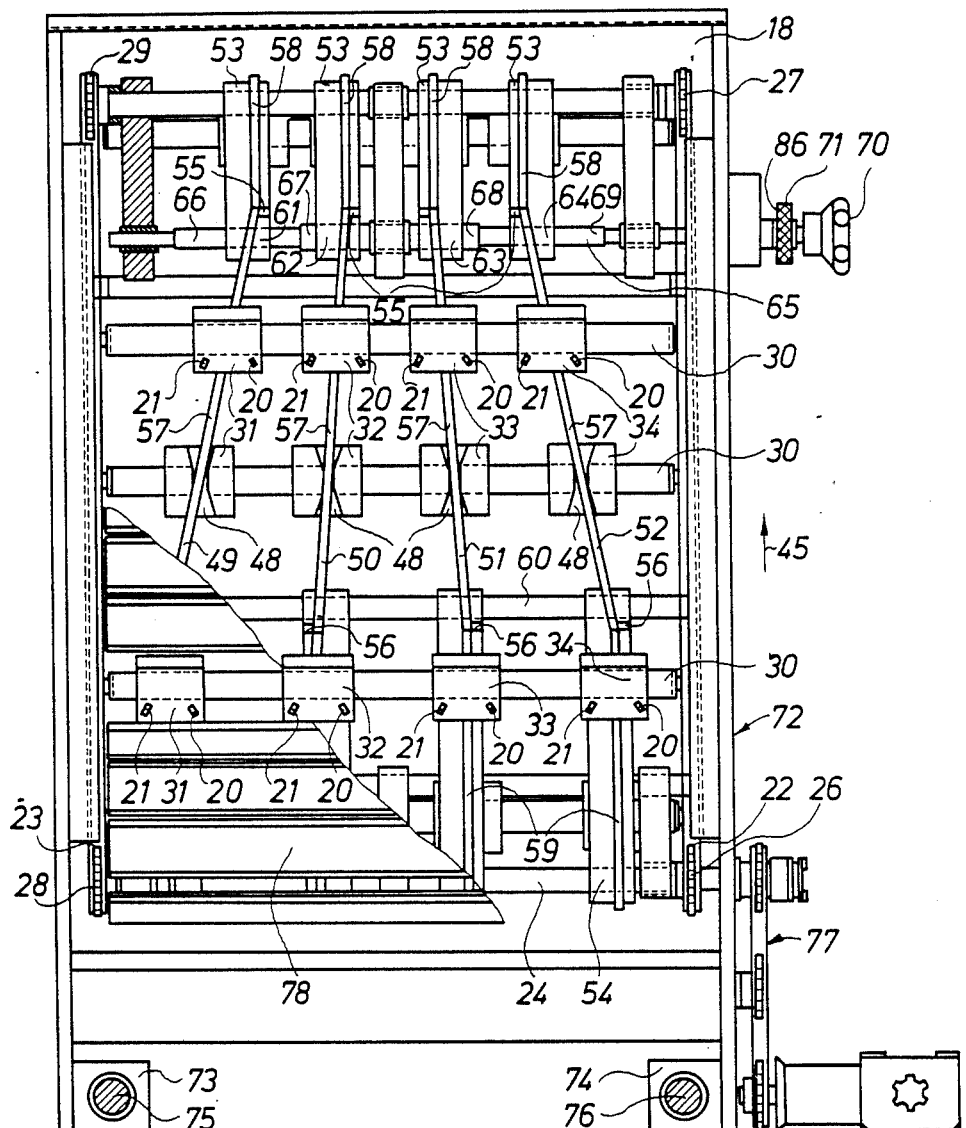
FIG. 8 illustrates part of the second conveyor of FIG. 7 taken along the line VIII—VIII, with parts removed for the sake of clarity.

The second conveyor 5 illustrated in FIGS. 2 and 3, and in more detail in FIGS. 7 and 8, comprises two conveyor members 17, 18 present on their respective side of the first conveyor at the front end of said first conveyor when seen in the advancing direction. The conveyor members are arranged with a mutual distance allowing free passage therebetween betweeen of the ice-cream cones 4. The two conveyor members 17 and 18 are identically shaped apart from the fact that they comprise differently shaped ice-cream cone-receiving means 19 and 20, 21, respectively. Therefore the conveyor member 18 is described in more detail only in connection with FIGS. 7 and 8. The conveyor member 18 comprises two parallel chain drives 22 and 23 extending vertically between a lower driving shaft 24 and an upper driven shaft 25, the chain drive 22 comprising a lower gear wheel 26 mounted on the shaft 24 and an upper gear wheel 27 mounted on the shaft 25. The chain drive 23 comprises a lower gear wheel 28 mounted on the shaft 24 and an upper gear wheel 29 mounted on the shaft 25.

The two parallel chain drives 22 and 23 carry a plurality of parallel, horizontally extending, and identical guide rails 30, which in the preferred embodiment are made of stainless steel and have a rectangular cross section. Four sliders 31, 32, 33, and 34 are mounted on each of the above guide rails 30, each slider carrying ice-cream cone-receiving means 20, 21. All the sliders 31, 32, 33, and 34 are completely identical, and therefore only one, for instance the slider 31 of FIGS. 7 and 8, will be described. The slider comprises a square solid plastic body 35 comprising on one side a transverse recess 36 for slidably receiving the associated guide rail 30 retained in said recess by means of a front plate 37 preferably made of stainless steel and mounted on the front side of the plastic body. The front end of the plastic body 35—when seen in the advancing direction 45 of the chains, is shaped with obliquely pointing surfaces 38 and 39 meeting at an edge 40. The front plate 37 is shaped in accordance with the shape of the plastic body in such a manner that at the top the front plate comprises a web 41 bent backwards and extending along the edge with a portion of the front plate 37 abutting the inclined surface 39. At the rear end of the plastic body—when seen relative to the advancing direction 45—the front plate 37 comprises a flange 43 extending along the rear end 42 of the plastic body 35. The front plate 37 is tightened to the plastic body by the web 41 bent backwards at the edge 40 co-operating with a pin 44 screwed backwards at the rear end 42 of the plastic body, said pin 44 thereby pressing against the flange 43 provided with a hole just allowing passage of the screwing tools in question, such as, for instance, a hexagonal pin spanner capable of passing within a hexagon hole in the pin 44. By screwing out the pin 44 which was located in the plastic body 35 prior to the mounting of the front plate 37, the pin 44 presses against the flange 43.

The above ice-cream cone-receiving means 19 and 20, 21 respectively, are mounted on the side of each front plate 37 facing the spacing between the members 17, 18 of the second conveyor. As illustrated in FIGS. 7 and 8, the ice-cream cone-receiving means 20 and 21 comprise two projecting pins supporting the broadest end of an ice-cream cone, whereas the receiving means 19 comprise a projecting pin 46 the outer end of which carries a V-shaped body 47 receiving the pointed end of an ice-cream cone 4.

On its back, each slider 31, 32, 33, and 34 is provided with a recess 48 shaped as a channel with a planar bottom and sides. From the center portion of the channel these sides expand continuously in their respective directions towards the front and rear ends, respectively, of the slider when seen in the advancing direction 45. At the center portion of the channel the sides are almost parallel. FIG. 8 illustrates the recesses 48 on the backs of the sliders 31, 32, 33, and 34 present on the back of the conveyor member 18 shown. The recesses 48 serves as guide grooves co-operating with their respective guides or their respective guideways 49–52 during the movement of the sliders 31–34 in the advancing direction, said guideways also being identically shaped.

Each guideway such as for instance the guideway 52 comprises an upper fixed guideway 53 and a lower fixed guideway 54 slidably mounted on the upper shaft 25 and the lower shaft 24, respectively. When seen in the directions of their respective shafts, the fixed guideways 53 and 54 are of a substantially elongated, approximately oval shape defined by semicircle at their respective ends and intermediary parallel lines. At the end of the fixed guideways 54 and 53, respectively, opposing the associated shafts 24, 25, curved recesses 56 and 55, respectively, are provided which extend from the side of the fixed guideway, the axis of the curve extending parallel to the shafts 24 and 25, but their associated centers of curvature are situated farther from the associated shafts 24, 25 than the curved recesses 55, 56 in question. These curved recesses 55, 56 are adapted to receive their respective ends of a round endless flexible belt 57 thus extending between the two fixed guideways 53 and 54. In connection with the curved recess 55 and 56 of each fixed guideway, a tongue or projection 58, 59 extends from each end of the curved recess 55 and parallel to the chain drives 22 and 23 along the side facing radially outwards of the fixed guideways. The size of this tongue 58 and 59, respectively, is adapted to the thickness of the belt 57 in such a manner that together they form an almost continuously extending tongue along the path of the entire conveyor member in question, said tongue everywhere engaging the recesses of the associated sliders or the guide grooves 48 in the corresponding sliders 31–34. In radial direction, with reference the oval shape, the fixed guideways are shaped in such a manner that the sliders are always engaged by the above continuous tongue during the entire movement of the sliders along their path. As illustrated in FIG. 8, four guideways 49, 50, 51, and 52 are present engaging their respective sliders 31, 32, 33, and 34 on each guide rail 30. These guideways determine the position of the sliders 31–34 on the associated guide rail 30.

In the illustrated embodiment, the lower four fixed guideways 54 are mounted at the same fixed mutual distance, viz. a distance corresponding to the mutual distance between the holders 9 on the first conveyor 1. Beyond being mounted on the common lower shaft 24, they are also mounted on a bar 60 extending through coaxial holes in the lower fixed guideways 56.

Unlike the above guideways, the upper fixed guideways are mutually displaceable in axial direction relative to the upper shaft 25 on which they are slidably mounted. This mutual displaceability of the illustrated embodiment has been obtained by the upper fixed guideways 53 comprising coaxial, threaded holes 61, 62, 63, and 64, respectively, of which the most spaced holes 61 and 64 are provided with the same thread but with oppositely directed direction of rotation. The two closest holes 62 and 63 are also provided with the same thread but with oppositely directed directions of rotation. The holes are furthermore adapted to co-operate with a common adjusting shaft 64 provided with threaded areas 66, 67, 68, and 69, respectively, corresponding to the holes 61–64, respectively. The threads in question have thus been adjusted to one another in such a manner that turning of the shaft 65 implies that the fixed guideways on the upper shaft 25 are always spaced from one another by the same distance during their displacement towards or away from one another relative to a radial center plane extending perpendicular to the shaft 25. This turning of the adjusting shaft 65 is ensured by means of an adjustment knob 70 mounted on an end projecting outside the frame of the conveyor member in question. On this end an adjustment disc 71 is mounted, said disc being fixedly connected to a sleeve 86 provided with threads. This sleeve co-operates with the bar 65 in such a manner that a turning of the adjustment disc causes an axial displacement of the shaft 65 and consequently of all four fixed guideways 53 connected thereto. Together with the remaining turnable shafts the shaft 65 is mounted in a manner not described here in more detail, on the frame 72 of the conveyor member in question. At the bottom the frame is mounted on adjusting blocks 73 and 74 connected to adjusting shafts 75 and 76. These adjusting shafts extend horizontally and parallel to one another between the conveyor members of the second conveyor in such a manner that the mutual distance of said members can be adjusted according to desire.

The two conveyor members 17 and 18 of the second conveyor are driven by means of a chain drive 77 in such a manner that the sets of ice-cream cone-receiving means of the two conveyor members 17 and 18 are moved synchronously relative to one another both in vertical direction and in horizontal direction. Therefore the two conveyor members 17 and 18 are driven by a common motor not shown in more detail here, and by suitable gears.

The spacing between the parallel guide rails 30 has been filled with guide lamellas 78 allowing a guiding of the ice-cream cones during their passage between the two conveyor members 17 and 18. Like the guide rails 30 these guide lamellas 78 are mounted on the two chain drives 22 and 23 in a manner not described more detailed.

Figure 9:
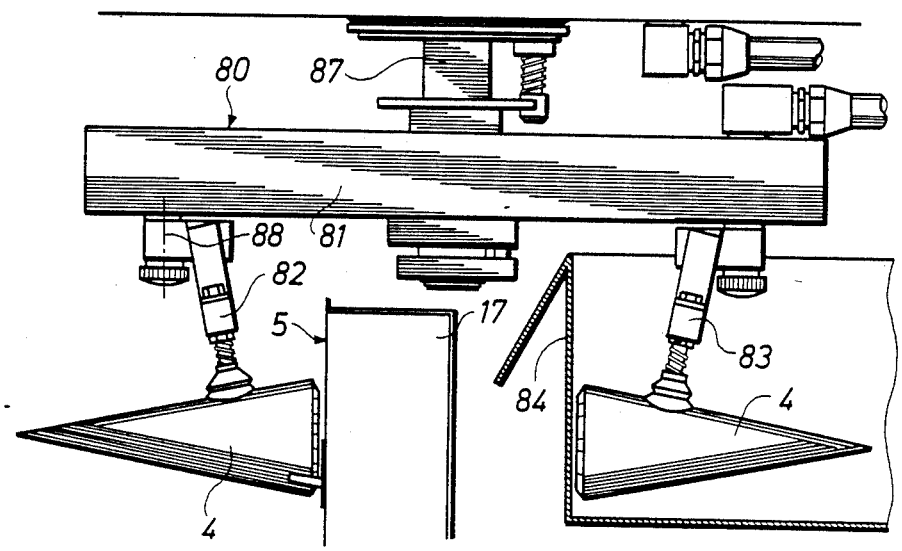
FIG. 9 is a larger scale diagrammatic view of a running gripping device, with parts removed for the sake of clarity.

At the upper end (FIG. 9), the second conveyor is adapted to co-operate with a gripping device 80. As regards structure and function, this gripping device corresponds to the device described in Danish Patent Application No. 1173/81, i.e., it comprises a gripping beam 81 carrying four suction heads 82 at each end. The gripping beam 81 is mounted both pivotably and displaceably on a vertical shaft 87 in such a manner that a set of suction heads 82, 83 are carried downwards so as to suck each group of four ice-cream cones when said cones reach the immediate vicinity of the upper end of the second conveyor 5. Subsequently the ice-cream cones are disengaged by the second conveyor and hoisted by turning the gripping beam 81 over the opening of an open packing box 84 in which the group of ice-cream cones 4 are situated when the gripping beam is carried downwards again so as to grip another group of ice-cream cones 4. The gripping of the ice-cream cones 4 at the second conveyor 5 is carried out at the same time as a group of ice-cream cones 4 are delivered into the packing box.

As described in the above-noted Danish patent application No. 1173/81, one set of the suction heads, such as, for instance, the set 82, is pivotably mounted about an axis 88 in such a manner that this set is turned 180° about the axis 88 each time the gripping beam is turned 180°. In this manner, the groups of ice-cream cones 4 are situated with the points facing in alternating directions within the packing box.

In a conventional manner, the packing box 84 is mounted on an elevator ensuring that the ice-cream cones 4 are released at almost the same level as the level at which they are to lie within the packing box 84. The packing boxes are advanced in a conventional manner and opened on a system 85 (FIGS. 1 to 3) not described here in detail.

The invention operates as follows: From an ice-cream cone production plant, the completed, but optionally not yet frozen ice-cream cones 4 are fed continuously to the first conveyor 1 in accordance with the advancing speed thereof in such a manner that an ice-cream cone 4 is positioned in each holder 9, the latter optionally being monitored by a suitable system (not shown). Such a monitoring system may comprise a discharge device removing ice-cream cones of a group remaining on the first conveyor 1 in case the monitoring system detects that one or more ice-cream cones are missing from the group in question. Therefore a group of empty ice-cream cone holders 9 are sometimes advanced from the monitoring system to the second conveyor 5. In these cases the system ensures that the guiding of the gripping device 80 is adjusted in such a manner that the suction heads of the gripping device are activated only when a complete group of ice-cream cones are advanced to the gripping device.

From the monitoring system only complete groups of ice-cream cones 4 are thus advanced to the second conveyor 5 as they are correctly positioned on the holders 9 of the first conveyor 1 with the broadest end sliding against the guide rail 15. When passing between the two conveyor members 17, 18 of the second conveyor 5, the guiding of the guide rails 15 of the ice-cream cones 4 is taken over by one of the guide lamellas 78 of the conveyor members 17 and 18. The set of opposing receiving means 19 and 20, 21, respectively, of the second conveyor 5 allow the ice-cream cones 4 to be gripped in groups and hoisted to a higher level. As this level they are gripped still in groups by the suction heads 82, 83 of the gripping device 80 and transferred into a packing box 84 in which they are situated in layers with the broadest ends pointing in different directions, alternately, if desired.

During the hoisting of the ice-cream cone gripping means of the second conveyor 5, said ice-cream cones are advanced to a mutual distance corresponding to the mutual distance of the suction heads by means of the guideways 49–52.

The activation of the first and second conveyor 1 and 5 as well as of the gripping device 80 has been synchronized. In the preferred embodiment the ice-cream cones are advanced on the first conveyor at a speed varying continuously according to a sine curve, in such a manner that the ice-cream cones are advanced at a relatively high speed between the two conveyor members 17 and 18 of the second conveyor 5. Subsequently, the speed is reduced in the short period the receiving means 19, 20, and 21 of the second conveyor 5 grip the group of ice-cream cones 4 in question. Correspondingly, the receiving means 19, 20, and 21 of the second conveyor 5 are advanced at a speed also almost following a sine curve, in such a manner that a relatively high speed they engage each group of ice-cream cones 4 and remove said group from the path of the first conveyor 1 whereas they carry the group to the meeting with the suction heads 82 of the gripping device at a relatively low speed. At now time during the handling of the ice-cream cones is the advancing movement thereof stopped, and therefore the system is not subjected to hampering stops and actuations. The speeds may, of course, be varied other than according to a sine function, provided the handling can be carried out without problems.

The adjustability of the sliders 31-34 by means of the adjustment knob 70 and the adjustment disc 71 implies that the distance between the ice-cream cones 4 of each group, as well as the positioning thereof in horizontal direction, is adapted to the suction heads 82 and 83. By adjusting the mutual distance of the suction heads 82 and 83 and their position relative to a vertical symmetric plane lengthwise through the gripping beam 81 in the outer positions thereof, it is thus possible partly to situate the ice-cream cones in the packing box with a desired mutual distance and partly to situate the layers of ice-cream cones with a desired mutual horizontal displacement. Furthermore, it is possible to adjust the second conveyor 5 in accordance with the size of the ice-cream cones in question as variations in the length of the ice-cream cones 4 involve an adjustment of the two conveyor members 17 and 18 of the second conveyor by means of their adjusting shafts 75 and 76.

The invention has been descirbed with reference to a preferred embodiment. Many alterations may be carried out without thereby deviating from the scope of the invention. The ice-cream cone holders 9 may, for instance, have other shapes than the shape illustrated and described. The handled articles may optionally also have shapes other than ice-cream cones, and then the shape of the holders is adapted thereto in such a manner that the articles are correctly oriented before being received in groups by the receiving means 19, 20, and 21 of the second conveyor 5, said means also being shaped in accordance with the shape of the articles in question.

The present invention describes the use of four cones in each group. Other sizes may, of course, also be used. Finally the gripping device 80 comprises suction heads in the described embodiment. These suction heads may, if desired, be replaced by mechanically operating gripping means receiving their respective ice-cream cones.

We claim:

1. A method of grouping, orienting and packing articles having a cross section perpendicular to a longitudinal direction, the area of said cross section substantially decreasing towards one end of the article, seen in the longitudinal direction, and whereby the articles are advanced in rows on conveyor means, and subsequently grouped and oriented so as finally to be grouped in groups by a gripping device positioning the articles in an open packing box by means of gripping means gripping their respective articles, comprising the steps of
(a) advancing said articles (4) in a first advancing direction (3) while they are lying directly on a first endless and continuously operating conveyor (1);
(b) receiving said articles (4) in groups on a second endless and continuously operating conveyor (5); and
(c) moving said articles (4) in a second advancing direction (45) extending substantially parallel to the moving direction of said gripping means (82, 83) of said gripping device (80) during a gripping phase of their working cycle, said second conveyor (5) adjusting the mutual spacing of said articles to the mutual spacing of said gripping means before the latter grip the articles (4) from said second conveyor (5).

2. A method as claimed in claim 1, wherein the articles (4) are advanced on the first conveyor (1) with opposite ends projecting to their respective side of the conveyor in the transverse direction of said conveyor, and wherein the second conveyor (5) receives the articles (4) from the first conveyor (1) by gripping said projecting ends of each article (4).

3. Apparatus for grouping, orienting and packing articles having a cross-section perpendicular to a longitudinal direction, comprising conveyor means advancing the articles to a gripping device gripping the articles in groups by means of gripping means and transferring said articles to an open packing, wherein said conveyor means comprise a first endless and continuously operating conveyor (1) with fixedly mounted holders (9) supporting respective articles in a subtantially mutually fixed position, and a second continuously operating conveyor (5) with means (19; 20, 21) receiving said articles in groups from said first conveyor without stopping the advancing movement thereof and moving said articles to a level where they are simultaneously gripped by the gripping means (82, 83) of the gripping device (80), and means for adjusting the mutual spacing of the articles (4) to the mutual spacing of said gripping means.

4. Apparatus as claimed in claim 3, wherein the second conveyor (5) comprises two mutually separated conveyor members (17, 18) situated on their respective side of the advancing path of the first conveyor (1), whereby each conveyor member comprises endless conveyor paths extending from a lower article-receiving level to a higher article-delivering level during the phase where they are carrying the articles (4).

5. Apparatus as claimed in claim 4, wherein the mutual spacing of the conveyor members of the second conveyor (5) is adjustable.

6. Apparatus as claimed in claim 4, wherein the holders (9) of the first conveyor (1) are of such an extent in the transverse direction of the conveyor that the opposite ends of the articles (4), when seen in the longitudinal direction thereof, project outside the holders (9), and wherein the receiving means of the second conveyor (5) comprises means (19; 20, 21) for (4) gripping the free ends of said articles, the receiving means (19; 20, 21) of each end of the article being situated on their respective conveyor member (17, 18) of the second conveyor (5).

7. Apparatus as claimed in claim 6, wherein the individual conveyor members (17, 18) of the second conveyor (5) comprises two vertically situated, parallelly extending chain drives (22, 23) carrying their respective ends of a plurality of parallel, horizontally extending guide rails (30), on which sliders (31-34) provided with receiving means are mounted, said sliders being freely displaceable on the rails (30) and corresponding in number to the number of articles (4) present in each group, one slider (31-34) being provided for each article (4), and wherein guideways (49-52) are provided between the chain drives, said guideways co-operating with the sliders (31-34) in such a manner that the mutual distance of said sliders at the lower article-receiving level corresponds to the mutual spacing of the articles on the first conveyor and at the higher article-delivering level corresponds to the mutual spacing of the suctions heads (82, 83).

8. Apparatus as claimed in claim 7, wherein the guideways (49-52) are mutually displaceable and each comprises fixed guideway members (53, 54) displaceably situated coaxially with the chain wheels (26, 27; 28, 29) of the chain drives (22, 23) and flexible guideway members (57) situated therebetween, each fixed guideway member (53, 54) comprising a projecting tongue (58, 59) co-operating with a corresponding groove (48) on the associated sliders (31-34), and wherein the flexible guideway members (57) are endless round belts secured to the fixed guideway members (53, 54) in such a manner that they extend between the associated fixed guideway members (53, 54) in extension of the tongues (58, 59) thereof in order to engage the grooves (48) of the sliders.

9. Apparatus as claimed in claim 8, wherein the fixed guideways (53) associated with at least the pair of chain wheels (27, 29) adjacent the article-delivering level comprise coaxially situated, threaded openings (61-64) co-operating with a common axially displaceable adjustment shaft (65) also provided with threaded areas (66, 67, 68, and 69, respectively) corresponding to each fixed guideway member, and wherein the threads of each fixed guideway (53) and the co-operating threaded areas (66-69) on the adjustment shaft (65) are shaped in such a manner that turning of the adjustment shaft (65) causes a change in the mutual spacing of the fixed guideways (53) such that the distance between said fixed guideways (53) is always the same.

10. Apparatus as claimed in claim 3, the articles are ice-cream cones, wherein each holder (9) on the first conveyor (1) comprises a center groove (12) with a substantially conical surface, the axis of which extends transverse to the advancing direction (3) of the conveyor with a slight inclination downwards to the side where the groove (12) is broadest, the first conveyor (1) comprising fixed guide means (15) against which the articles slide on the side adjacent the broadest end of the center groove (12) of the holders (9), and wherein each holder (9) comprises planar guide webs (13, 14) inclining upwards and to their respective sides of the center groove (12) and along the advancing direction (3) of the first conveyor (1).

11. Apparatus as claimed in claim 10, wherein guide lamellas (78) are provided between guide rails (30) of the second conveyor (5) said lamellas also being carried by the chain drives (22, 23) and assuming the function of the first guide means (15) during passage of the articles (4) between the conveyor members (17, 18) of the second conveyor (5) at least at one side of the first conveyor (1).

* * * * *